(12) United States Patent
Bradshaw et al.

(10) Patent No.: US 7,451,636 B2
(45) Date of Patent: Nov. 18, 2008

(54) NANOINDENTATION SURFACE ANALYSIS TOOL AND METHOD

(75) Inventors: Richard L. Bradshaw, Tucson, AZ (US); Urs T. Duerig, Rueschlikon (CH); Bernd W. Gotsmann, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/358,883

(22) Filed: Feb. 21, 2006

(65) Prior Publication Data

US 2007/0193347 A1      Aug. 23, 2007

(51) Int. Cl.
*G01N 3/32* (2006.01)
(52) U.S. Cl. .......................................... 73/83
(58) Field of Classification Search ........................ None
See application file for complete search history.

(56) References Cited

U.S. PATENT DOCUMENTS

| | | | | |
|---|---|---|---|---|
| 4,858,145 A | | 8/1989 | Inoue et al. | |
| 5,193,383 A | * | 3/1993 | Burnham et al. | 73/105 |
| 5,866,807 A | * | 2/1999 | Elings et al. | 73/105 |
| 6,457,349 B1 | * | 10/2002 | Miyahara et al. | 73/82 |
| 6,668,627 B2 | | 12/2003 | Lange et al. | |
| 2002/0179833 A1 | | 12/2002 | Shirakawabe | |
| 2004/0218302 A1 | | 11/2004 | Maat | |

OTHER PUBLICATIONS

Baker (2000) Proceedings of the Materials Research Society Symposium Q 649:379.
Hong (1988) Materials Research Society Symposium Proceedings 130:93.
Oesterschulze (1998) Applied Physics A 66:S3.

* cited by examiner

*Primary Examiner*—Robert R Raevis
(74) *Attorney, Agent, or Firm*—Dan Shifrin

(57) ABSTRACT

The present invention provides a novel method for determining the mechanical properties of the surfaces of materials including thin films. Generally, the method is comprised of laterally scanning the surface of the film with an array of cantilever tips varying temperature, load and time to obtain a measurement of mechanical properties, such as hardness and glass transition temperature. The method can be used to obtain mechanical properties of films that would otherwise be unobtainable using standard methods.

12 Claims, 7 Drawing Sheets

NANOINDENTATION SURFACE ANALYSIS TOOL AND METHOD

TECHNICAL FIELD

The present invention relates generally to the field of nanoscale surface analysis. More specifically, the present invention relates to a novel method for the measurement of the mechanical properties of the surfaces of materials and thin films.

BACKGROUND ART

One of the most important material configurations in the field of microelectronics, thin film technology and surface coatings technology consists of a polymeric coating material deposited as a thin film onto a substrate of another material. The proper selection of polymeric materials and their ongoing inspection for process control often requires very precise knowledge of the mechanical properties. Currently, mechanical analysis is destructive and a bulk property analysis. For many parts, coatings and thin films made from plastics, the bulk properties are not the crucial property which needs to be monitored or controlled. It is the mechanical properties of the surface of the coating or molded material which is of crucial interest. Most mechanical characterization instruments and methods are unable to evaluate real surface of a material, but instead look at a shallow but still bulk response for the film or material. Typically, hardness as a function of temperature, especially relative to glass transition temperature (Tg) of the surface of the material or thin film is not directly or efficiently measured.

Two types of instruments have been developed to facilitate studies of thin films: the depth-sensing nanoindentor (Pethica et al. (1983) Philos. Mag. A 48:593) and the atomic force microscope (AFM) (Binnig et al. (1986) Phys. Rev. Lett 56:930). For depth-sensing nanoindentation a controlled, variable force is applied to a sample by the indenter and the resulting displacement of the indenter is measured. The resulting "load vs displacement" data can then be analyzed to obtain mechanical properties, such as hardness and elastic modulus using well established models. Using the AFM-based indentation techniques, measurements are displacement controlled—the sample is displaced against a cantilever indenter via a piezoelectric actuator—and forces are inferred from the measured deflection of the cantilever and its (nominally) known spring constant. Several different cantilever configurations and displacement detection schemes have been developed to obtain these measurements. AFM technology can be used to analyze a number of mechanical and thermomechanical properties of films including hardness, Tg or modulus.

Since the invention of the scanning tunneling electron microscope (STEM) and the related atomic force microscope (AFM) (U.S. Pat. No. 4,343,993), numerous advances have been made in devices and methods using this technology (see e.g., U.S. Pat. Nos. 5,729,026; 5,804,709; 5,808,302; 5,907,096; 5,920,837 and 5,920,837). IBM continues to improve components and methods to exploit this powerful new technology with improvements in tip fabrication, sensors and integration, making practical very novel arrays of AFM tips (see e.g., U.S. Pat. Nos. 6,085,580; RE37299; 6,249,747; 6,369,400; 6,647,766; 6,862,925 and 5,856,967). Efforts to employ an AFM tip array for storage of information have been pursued and a number of crucial inventions have resulted from that effort. Devices for ultra high-density, high speed data storage applications using thermomechanical writing and thermal readout in thin polymer films as storage media work on the basis of atomic force microscopy (AFM) and are described in a number of patents and in the following publications representing the state of the art (see e.g., Mamin et al. (1995) *IBM J. Res. Dev.* 39(6):681-700; Grochowski and Hoyt (1996) *IEEE Tran. Magnetics* 32(3):1850-1854; Reid et al. (1997) *Micromech. Syst.* 6(4):294-302; Mansuripur, *The Pres Syn. University of Cambridge,* 1st Paperback Ed., pp. 463-464 and 575, 1998; Binnig et al. (1999) *Applied Physics Let.* 74(9):1339-1341; and Despont et al., "VLSI-NEMS Chip for AFM Data Storage", Micro Electro Mech Sys., MEMS '99 IEEE Inter Conf. January 1999, pp. 564-569, 1999. In the process of pursuing AFM for information storage in a polymeric medium, it became evident that temperature and load profiles, made by AFM tips on potentially useful polymer materials, were providing information about the surface of the polymer film not previously measurable with such precision and relevance.

The basic components of an AFM, as illustrated in FIG. 1A, are the cantilever beam (2) and support (5), the probe tip (1), the specimen support (4) on which the specimen (3) is mounted, the x, y, z positioning stage (6), a light source for optical deflection sensing (7), a position sensitive detector (8) and control electronics for position staging (9). A key element of the AFM is its microscopic force sensor, or cantilever. The cantilever (2) is typically formed by one or more beams of silicon or silicon nitride, which are 100 to 500 μm long and about 0.5 to 5 μm thick. Mounted on the end of the cantilever is a sharp tip (1), also referred to herein as the indenter, that is used to sense a force between the sample and the tip. For normal topographic imaging the probe tip is also comprised of plain silicon or silicon nitride. In order to obtain information on mechanical properties such as hardness typically the tip is comprised of silicon, silicon nitride or diamond. Silicon tips are preferable because they are the easiest to microfabricate and they allow the resistive heater to be included. However, heatable silicon nitride and diamond probes have also been used.

The shape of the tip, in particular the radius of curvature at the apex, is one of the most critical parameters in materials testing by means of nanoindentation. The tip radius determines the scale factor relating the experiment loading force to the mechanically relevant local stress (see K. L. Johnson, Contact Mechanics, Cambridge University Press, 1985). Using an indenter with an apex radius of 10 nm, local stresses exceeding 10 GPa can be produced on hard specimens (elastic modulus on the order of 10 GPa) with loading forces on the order of 1 μN. As a result of the high stress acting on the indenter tip the latter wears rapidly resulting in a blunted apex after only a few indentation experiments. Materials hardness, also expressed in terms of yield stress, is assessed by measuring the stress value at which the material is irreversibly deformed. Hard plastics exhibit yield stresses on the order of several GPa below the glass transition temperature. Hence, tip-wear is a serious issue in such investigations.

While AFM, as well as, other currently existing techniques can be used to analyze the mechanical properties of the majority of thin films there are distinct disadvantages associated with these techniques which limit their general applicability. In particular, many current methods are lacking in their ability to provide information on Tg and hardness for many thin films for a number of reasons. First, in some instances the material can only be made in thin film form without sacrificing essential properties. An example is paints or resists which have to be cured under defined conditions, i.e. in the thin film state. Most current techniques however, require more material than a mere film. For example, for calorimetry approximately a milligram of material is needed. Thus, often the film is too thin for conventional hardness testing. Attempts to alleviate this problem using sharper tips and shallower indents as in "nanoindentation" suffer from rapid tip wear after only few indentations. With respect to glass transition temperature (Tg) the film is often not thick enough to allow the application of bulk averaging techniques such as Differential Scanning Calorimetry (DSC) or Dynamic Mechanical Thermal Analysis (DMTA), etc; or the film is made on a sample substrate which itself degrades thermally or interferes otherwise with the measurement. In particular, the sample may not be heatable to sufficiently high temperatures; and other, non-averaging techniques for surface characterization (such as AFM friction measurements) are often too tedious. Finally, occasionally the material may only be made as one of several phases of a compound for which techniques for the measurement of Tg and hardness are not yet available. Published methods are often not sufficiently reliable and their application is typically too tedious to be of practical use.

There remains a need for an improved method for measuring the mechanical properties of thin films which meet the following criteria: spatially resolves data on hardness and Tg in the sub 100 nm range (laterally), can be applied to thin films having a thickness of less than or equal to 10 nm; thereby only modifying the material by heat or plastic deformation within the same dimensions of a few nm or less (typically the full sample, usually a wafer of cm-dimensions or greater must be heated); allows for fast throughput of samples; alleviates the tip-wear problem associated with hardness testing, preferably allows for measurement of the most important properties in one measurement, i.e. Tg, hardness and roughness and more preferably thermomechanical shift-factors; and ideally can perform the measurements as a function of depth. Most preferably the improved method would allow for the in situ analysis by nondestructive means. This is particularly important for materials that are present on a delicate device.

Accordingly, an object of this invention is to provide a method for analyzing the mechanical properties of thin films that meets the criteria set forth above.

SUMMARY OF THE INVENTION

The present invention includes a method for measuring the mechanical properties of a surface in the nanoscale range. More specifically, the present invention includes a method for measuring the mechanical properties, preferably the hardness and glass transition temperature (Tg) of a thin film as a function of temperature, load and time using a nanoindentation surface analysis tool as illustrated in FIG. 1. Generally, the nanoindentation surface analysis tool of the present invention is comprised of a heatable cantilever which is operatively connected to a microfabricated tip, means for supporting a sample such that a variable load force can be applied between the cantilever/tip and the sample, means for applying a variable load force to the cantilever/tip and means for controlling the temperature of the cantilever/tip. In one embodiment, the means for applying variable load forces to the cantilever/tip is comprised of application of an electrostatic potential (conductive substrate under the sample). In its most basic embodiment, the present invention is drawn to a method for measuring the mechanical properties of a surface as a function of temperature, load, and the duration of time of applying said temperature and load, said method comprising the steps of:
 a) providing a cantilever tip;
 b) positioning said tip relative to the surface;
 c) contacting said tip with the surface;
 d) heating said tip to a select temperature;
 e) applying a select load to said tip for a select time; and
 f) determining the depth of indentation.

In preferred embodiments, steps b) to f) are repeated positioning said tip at select intervals along X and Y axes, with a first incremental select spacing along the X axis and a second incremental spacing along the Y axis, wherein one parameter selected from the group consisting of temperature, load and time is varied a first incremental select amount between each position along the X axis and a second parameter, different from the first parameter, selected from the group consisting of temperature, time and load is varied a second incremental select amount between each position along the Y axis. The method according to this embodiment is comprised of the steps of:
 a) providing a cantilever tip;
 b) positioning said tip relative to the surface;
 c) contacting said tip with the surface;
 d) heating said tip to a select temperature;
 e) applying a select load to said tip for a select time;
 f) determining the depth of indentation; and
 g) repeating steps b) to f) positioning said tip at select intervals along X and Y axes, with a first incremental select spacing along the X axis and a second incremental spacing along the Y axis, wherein one parameter selected from the group consisting of temperature, load and time is varied a first incremental select amount between each position along the X axis and a second parameter, different from the first parameter, selected from the group consisting of temperature, time and load is varied a second incremental select amount between each position along the Y axis.

The resolution with which the measurement of hardness is made is dependent on the number of indents representing the probed parameter space. Generally, resolution increases as the number of indents increases. Since the formation of an indent lasts for the indentation time interval the rate of scanning accordingly decreases with the resolution of the experiment. Thus, in one embodiment of the invention, the surface is laterally scanned a first time over a broad range of temperature and load and only a small number, typically less than 100, indents are written to obtain a coarse or low resolution determination of hardness as a function of temperature and load, followed by a second more detailed lateral scan comprising a large number of indentations, typically more than 100, over a narrower range of temperature and load to provide a finer i.e. higher resolution determination of hardness and Tg as a function of temperature and load. This embodiment allows for a faster more cost effective measurement of hardness and Tg, particularly when an unknown surface is being analyzed. In this embodiment the method of the invention is comprised of the steps of:
 a) providing a cantilever tip;
 b) positioning said tip relative to the surface;
 c) contacting said tip with the surface;
 d) heating said tip to a select temperature;
 e) applying a select load to said tip for a select time;
 f) determining the depth of indentation;
 g) repeating steps b) to f) positioning said tip at select intervals along X and Y axes, with a first incremental select spacing along the X axis and a second incremental spacing along the Y axis, wherein said temperature is varied a first incremental select amount between each position along the X axis and the load is varied a second incremental select amount between each position along the Y axis; and
 h) optionally repeating step g) at a select time wherein a second positioning at select intervals along the X axis is performed with a third incremental select spacing along the X axis, wherein said third incremental spacing is less than said first incremental spacing and wherein a second positioning at select intervals along the Y axis is performed with a fourth incremental select spacing along the Y axis, wherein said fourth incremental spacing is less than said second incremental spacing.

In step g) only a small number of indents are written, typically less than 100, representing the parameter space; separating the indents sufficiently far apart so that they don't overlap, typically 20 to 100 nm; the previously scanned surface is then imaged in order to obtain a topographic map using the same indenter tip and cantilever as AFM imaging device; using the topographic map to determine the parameter range providing indents with suitable depth, between 1 and 50 nm preferably less than 20 nm, and width, preferable less than 50 nm.

In yet another embodiment of the invention, the method is performed using an array of cantilever tips as illustrated in FIG. 1C. The primary advantage of using an array of tips is that the speed of the analysis can be dramatically increased. Additionally, in an array different tips can probe different sections of the parameter space all at the same time, effectively providing a third dimension for representing the parameter space, i.e. x scan-axis=temperature y scan-axis=time, and z cantilever=loading force. This embodiment of the invention is comprised of the steps of:
  a) providing an array of more than one cantilever tip, wherein each of said tips in said array of tips is spaced at a select distance along X and Y axes;
  b) positioning said array of tips relative to the surface;
  c) contacting more than one of said tips in said array of tips with the surface;
  d) heating more than one of said tips in said array of tips to a select temperature;
  e) applying a select load to more than one tip in said array of tips for a select time;
  f) determining the depth of indentation produced by each of said tips;
  g) repeating steps b) to f) positioning said array of tips at select intervals along the X and Y axes, with a first incremental select spacing along the X axis and a second incremental spacing along the Y axis, wherein one parameter selected from the group consisting of temperature, load and time is varied a first incremental select amount between each position along the X axis and a second parameter, different from the first parameter, selected from the group consisting of temperature, time and load is varied a second incremental select amount between each position along the Y axis.

According to this embodiment, temperature, load and time are independently varied along either the X or Y axis of the array as described in detail below. Thus, if temperature is varied along the X axis then the load or time is varied along the Y axis and visa versa. Lateral scanning of the surface then produces an array of indentations or surface pits, which reflect a temperature and hardness profile of the surface being analyzed. The array produced is then recovered on a cold scan of the pit array and the data is converted into a plot of hardness versus temperature, thereby providing the Tg and hardness of the surface as a function of temperature and load.

In preferred embodiments, the surface is laterally scanned a first time over a broad range of temperature and load and only a small number, typically less than 100, indents are written to obtain a coarse or low resolution determination of hardness as a function of temperature and load, followed by a second more detailed lateral scan comprising a large number of indentations, typically more than 100, over a narrower range of temperature and load to provide a finer i.e. higher resolution determination of hardness and Tg as a function of temperature and load. This embodiment of the invention is comprised of the steps of:
  a) providing an array of more than one cantilever tip, wherein each of said tips in said array of tips is spaced at a select distance along X and Y axes;
  b) positioning said array of tips relative to the surface;
  c) contacting more than one of said tips in said array of tips with the surface;
  d) heating more than one of said tips in said array of tips to a select temperature;
  e) applying a select load to more than one tip in said array of tips for a select time;
  f) determining the depth of indentation produced by each of said tips;
  g) repeating steps b) to f) positioning said tip at select intervals along the X and Y axes, with a first incremental select spacing along the X axis and a second incremental spacing along the Y axis, wherein said temperature is varied a first incremental select amount between each position along the X axis and the load is varied a second incremental select amount between each position along the Y axis; and
  h) optionally repeating step g) wherein a second positioning at select intervals along the X axis is performed with a third incremental select spacing along the X axis, wherein said third incremental spacing is less than said first incremental spacing and wherein a second positioning at select intervals along the Y axis is performed with a fourth incremental select spacing along the Y axis, wherein said fourth incremental spacing is less than said first second incremental spacing.

In another embodiment, the present invention is drawn to a method for measuring the mechanical properties of a surface as a function of temperature and time, preferably as noted above using an array of cantilever tips as illustrated in FIG. 1C. In this embodiment said method is comprised of the steps of:
  a) providing an array of more than one cantilever tip, wherein each of said tips in said array of tips is spaced at a select distance along X and Y axes;
  b) heating more than one tip in said array to a select temperature;
  c) positioning said array of tips relative to the surface;
  d) contacting more than one of said tips in said array with the surface;
  e) applying a select force to more than one tip in said array;
  f) determining the depth of indentation produced by each of said tips;
  g) repeating steps b) to f) positioning said array of tips at select intervals along the X and Y axes, with a first incremental select spacing along the X axis and a second incremental spacing along the Y axis, wherein said temperature is varied a first incremental select amount between each position along the X axis and the time is varied a second incremental select amount between each position along the Y axis; and
  h) optionally repeating step g) wherein a second positioning at select intervals along the X axis is performed with a third incremental select spacing along the X axis, wherein said third incremental spacing is less than said first incremental spacing and wherein a second positioning at select intervals along the Y axis is performed with a fourth incremental select spacing along the Y axis, wherein said fourth incremental spacing is less than said second incremental spacing.

In another embodiment, the present invention is drawn to a method for measuring the mechanical properties of a surface as a function of load and time, preferably as noted above using an array of cantilever tips. In this embodiment said method is comprised of the steps of:

a) providing an array of more than one cantilever tip, wherein each of said tips in said array of tips is spaced at a select distance along X and Y axes;
b) heating more than one tip in said array to a select temperature;
c) positioning said array of tips relative to the surface;
d) contacting more than one of said tips in said array with the surface;
e) applying a select force to more than one tip in said array;
f) determining the depth of indentation produced by each of said tips;
g) repeating steps b) to f) positioning said array of tips at select intervals along the X and Y axes, with a first incremental select spacing along the X axis and a second incremental spacing along the Y axis, wherein said force is varied a first incremental select amount between each position along the X axis and the time is varied a second incremental select amount between each position along the Y axis; and
h) optionally repeating step g) wherein a second positioning at select intervals along the X axis is performed with a third incremental select spacing along the X axis, wherein said third incremental spacing is less than said first incremental spacing and wherein a second positioning at select intervals along the Y axis is performed with a fourth incremental select spacing along the Y axis, wherein said fourth incremental spacing is less than said second incremental spacing.

To date arrays with more than 4000 tips have been constructed. In preferred embodiments of the invention the size of the array is selected from the group consisting of 8-16 tips. In preferred embodiments, the cantilever tip/indenter of the instant invention is comprised of a material selected from the group including, but not limited to silicon, silicon nitride, and diamond, diamond like carbon (DLC) or amorphous carbon and the sample is a thin film. With regard to temperature, force and time ranges, unless stated otherwise it is implicitly assumed that the tip (indenter) temperature is greater than or equal to room temperature approximately 20° C. and less than or equal to 600° C.; the force/load is selected from a range greater than or equal to 10 nN and less than or equal to a few (approximately 2) μN and the time during which the force and/or heat is applied to the tip (indenter) is greater than or equal to 1 μs and less than or equal to 1 s.

In preferred embodiments, the scan velocity of the fast axis is between 1 micrometer/s and 1 mm/s and the scan velocity of the slow scan axis is 10 to 1000 times slower depending on the number of lines in the total scan. A coarse scan is carried over a wide range of temperature (20° C. to 600° C. using a coarse sampling rate ~1 sample/50° C.) and a wide range of load (10 nN to several μN using a coarse sampling rate of 1 sample per 100 nN). To perform the scan either the probe tip array or the sample can be moved. In preferred embodiments, the array is fixed and a precision sample stage is employed to move the sample under the fixed tip array. Using the results obtained from the coarse scan a finer, higher resolution scan is made. The temperature and load of the fine scan is dependent upon the surface being analyzed.

The method disclosed herein allows spatial resolution of data on hardness and Tg in the sub 100 nm range (laterally), can be applied to films having a thickness of less than 10 nm; only affecting the material within the same dimensions of a few nm or less; allows for fast throughput of samples; alleviates the tip-wear problem associated with conventional methods, allows for measurement of the most important properties of films, including but not limited to Tg, hardness, elastic modulus, loss modulus, cross-link density, material homogeneity and solvent-uptake in one measurement, and can perform the measurements as a function of depth. Additionally, the method makes possible the in situ analysis of thin films by nondestructive means.

It is to be understood that both the foregoing general description and the following detailed description are exemplary and explanatory only and are not restrictive of the invention as claimed.

DETAILED DESCRIPTION OF THE PREFERRED EMBODIMENT

Figure 1A:
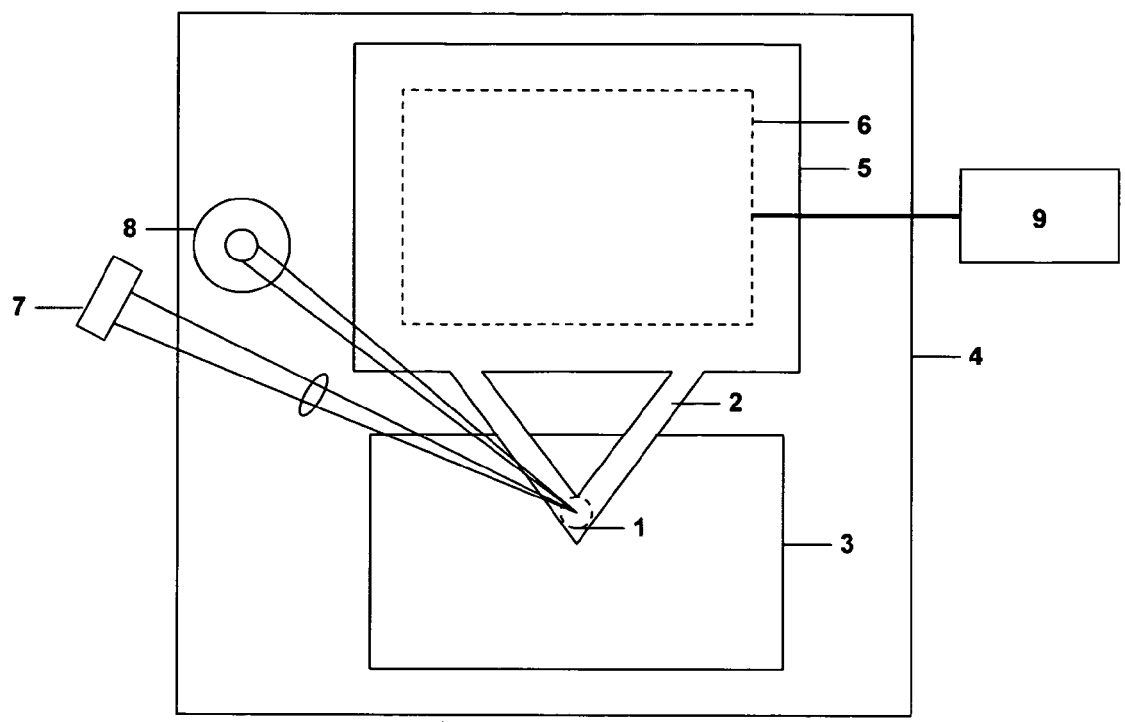
FIG. 1A is a perspective view of the basic components of an Atomic Force Microscope (AFM), which is consistent for use with the method of the present invention.

The present invention includes a method for measuring the mechanical properties of a surface in the nanoscale range. More specifically, the present invention includes a method for measuring the mechanical properties, preferably hardness and glass transition temperature (Tg) of a thin film as a function of temperature, load and time using a nanoindentation surface analysis tool as illustrated in FIG. 1. Generally, the nanoindentation surface analysis tool of the present invention is comprised of a heatable cantilever which is operatively connected to a microfabricated tip, means for supporting a sample such that a variable load force can be applied between the cantilever/tip and the sample, means for applying a variable load force to the cantilever/tip and means for controlling the temperature of the cantilever/tip.

Figure 1B:
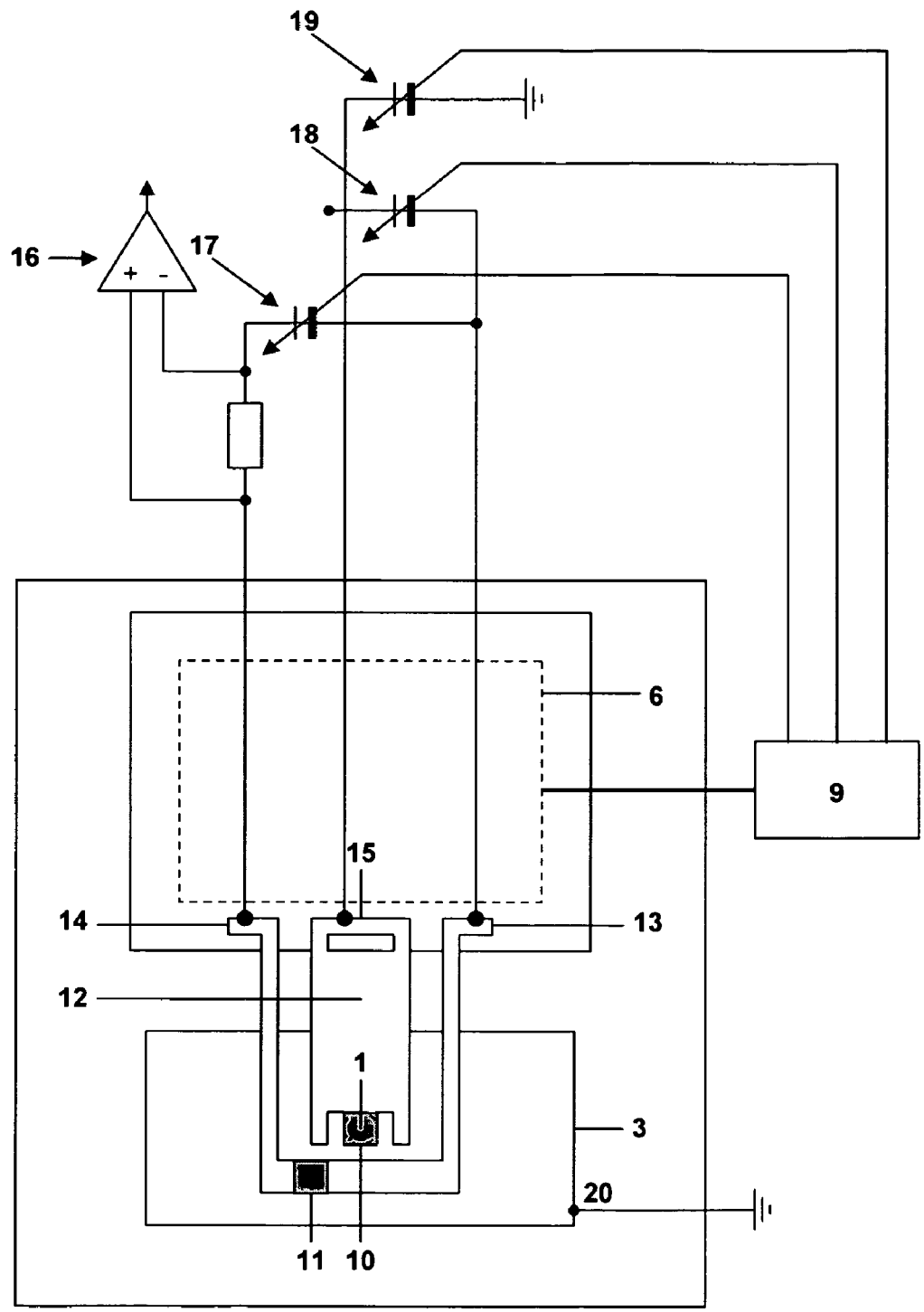
FIG. 1B is a perspective view of a cantilever force sensor consistent for use with the method of the present invention with a schematic of associated components.
Figure 1C:
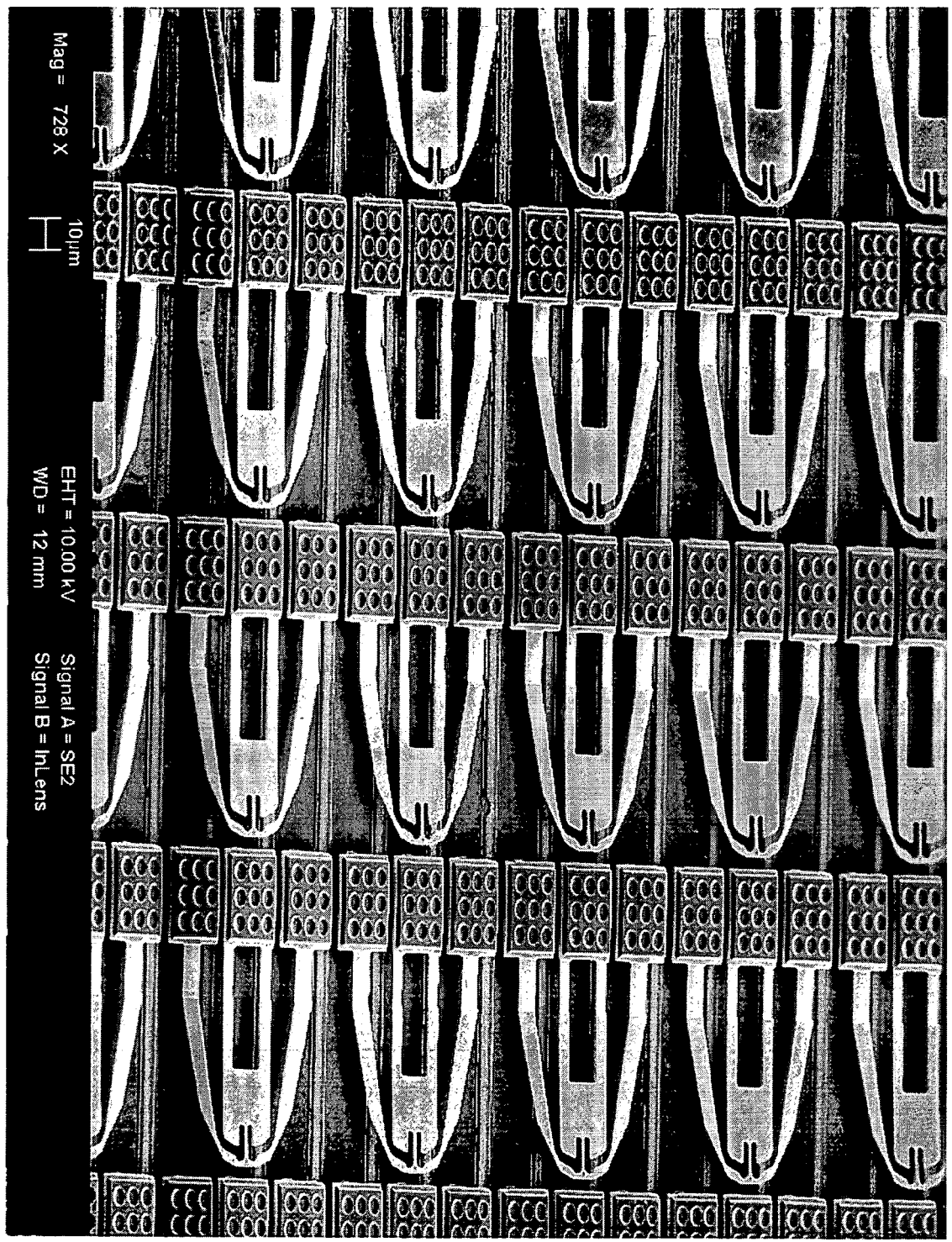
FIG. 1C is a scanning electron microscope image of an AFM tip array consistent for use with the method of the present invention.

In one embodiment, the method of the instant invention is performed using an apparatus as illustrated in FIG. 1B. With reference to FIG. 1B, the apparatus is comprised of a cantilever force sensor which provides means: (1) for heating the indenter tip 1, (2) for applying a force to the indenter tip, and (3) for sensing the cantilever deflection, as well as, (4) control electronics 9 which allow implementation of the specific experimental protocols disclosed herein. The embodiment of FIG. 1B is provided for purposes of illustration only and shall not limit the scope of the invention.

The cantilever illustrated in FIG. 1B is described in detail in European Application Serial No. EP 05405018.2, filed Jan. 13, 2005, entitled "Probe for Scanning over a Substrate and Data Storage Device," which is incorporated herein by reference in its entirety. Briefly, it is made of electrically conducting, highly doped (app. $10^{20}$ cm$^{-3}$) silicon. It is comprised of two low-doped ($10^{16}$-$10^{18}$ cm$^{-3}$) resistive heater elements 10 and 11, which can be individually energized by connecting an electrical power source to the contacts 15/13 and 14/13, respectively. The indenter tip 1 is heated by means of heater element 10, which is in good thermal contact with the tip. Alternatively, the tip can be heated using electromagnetic radiation, which is converted to heat upon absorption.

The heater element 11 serves as a means for thermoelectric deflection sensing. A cantilever deflection causes a corresponding change in the distance between the heater element 11 and the specimen, and thus, also in the thermal resistance for heat dissipation. This in turn leads to a modulation of the heater temperature, which via the temperature dependence of the heater resistance is converted into an electrical signal by means of amplifier 16. Alternative methods known from AFM-technology, including, but not limited to optical beam deflection sensing and optical interferrometry can also be employed for deflection sensing. The cantilever is further comprised of a capacitive electrode 12 for applying a loading force on the indenter. By applying an electrical potential between electrode 15 and the specimen substrate electrode 20, electrostatic forces pull the platform towards the specimen. Alternative suitable methods for applying a loading force on the indenter tip include, but are not limited to: electromagnetic excitation (see i.e. S. P. Jarvis et al., Appl. Phys. A 66:211-213 (1998)) or use of the vertical displacement mechanism 10 for inducing an upward bending of the cantilever which translates into a corresponding loading force by virtue of the stiffness of the cantilever.

Controller 9 actuates the positioning stage 6 and the electrical power sources 17, 18, and 19 in accordance with experimental protocols described below. So-called indentation phase space maps have proven particularly fruitful for materials testing which is the subject of the instant invention. An indentation phase space map is a real space 2-D topographic image of the specimen area, which has been subjected to a series of indentations executed at real space positions $x_k/y_k$. The discrete set of positions $\{x_1/y_1, \ldots x_N/y_N\}$ is unequivocally mapped onto a corresponding discrete set of n-tupels $\{p^1{}_1/\ldots/p"_1, \ldots, p^1{}_N/\ldots/p"_N\}$ where an n-tuple $(p^1{}_k/\ldots/p"_k)$ describes a point in the abstract phase space $p^1, \ldots, p^n$ characterizing the indentation. Typical indentation phase space coordinates are $p^1$=the indenter temperature, T, $p^2$=the loading force, F, and $p^3$=the indentation time, t, (time span during which the indenter is loaded and heated). More phase space coordinates are conceivable, i.e. characterizing more complex time-domain patterns for the heat and force excitation.

Figure 2:
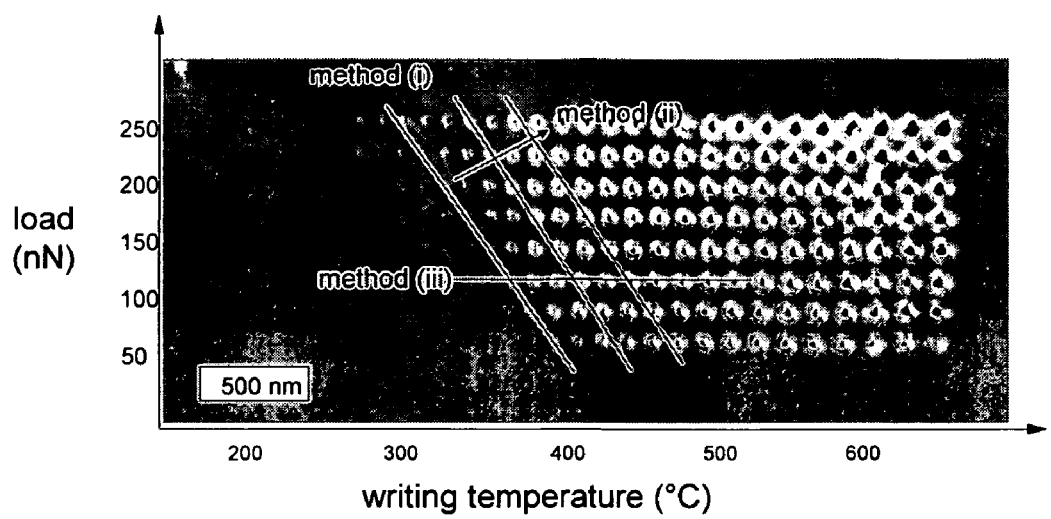
FIG. 2 depicts a load-temperature indentation map measured as described in Example 1 for a 20 nm thick PMMA sample. The lines indicate the subset of indentations used for extracting Tg and hardness according to methods (I), (II) and (III), respectively.

FIG. 2 illustrates a load temperature map obtained according to the method described herein. This is an indentation phase space map for a fixed $p^3$=indentation time of 10 μs, t, and in which the real space x-axis is mapped onto $p^1$=the indenter temperature, T, and the real space y-axis is mapped onto $p^2$=the loading force, F. The specimen analyzed was a 20 nm thick PMMA film on a Si-substrate. With reference to FIG. 2, it can be seen that not every write event resulted in a plastic deformation seen as a permanent indent. The indentation depth is a function of heat and load and serves as a natural characterization criterion. Other possible criteria are diameter of the indent or rim height or any mathematical combination thereof.

The so-called kinetic map is another type of particularly useful indentation phase map. In the case of a kinetic map, the load is fixed and the time-axis is mapped on the real space x-axis and the temperature is mapped on the real space y-axis. Generically, materials properties are extracted from analyzing the functions T(F) and T(t) for a fixed value of the depth of the indents for the load-temperature and the kinetic map, respectively.

The means selected for applying load, include, but are not limited to (1) an electrostatic potential, (2) a piezoelectric effect moving lever or sample, and (3) an electromagnetic element integrated into the cantilever. The cantilever tip is comprised of any material selected from the group including, but not limited to (1) silicon, (2) silicon nitride, and (3) diamond, diamond like carbon (DLC) or amorphous carbon. Additionally, other materials, including, but not limited to hard metals (i.e., tungsten) or other hard coatings (i.e., TiN) are also possible. In a preferred embodiment the tip is comprised of silicon. The cantilever is comprised of any material selected from the group including, but not limited to (1) silicon, (2) silicon nitride, (3) diamond, DLC or amorphous carbon, and (4) ceramics used in micro electromechanical systems (MEMS).

The heater, which is placed in the cantilever at the base of the tip, is comprised of either silicon or a metal. Alternatively, the tip can be heated via radiation (LASER). In one embodiment the sample is a thin film, however the sample can also be thick. The only restriction on the sample is that it must be such that the surface properties are measurable. The sample can also be a particle or body (cluster, biological object) which lies on a substrate surface.

The general method of the instant invention for analyzing the surface of thin films is set forth in Example 1. As noted above, in its most basic embodiment, the present invention is drawn to a method for measuring the mechanical properties of a surface as a function of temperature, load or time, said method comprising the steps of: a) providing a cantilever tip; b) positioning said tip relative to the surface; c) contacting said tip with the surface; d) heating said tip to a select temperature; e) applying a select load to said tip for a select period of time; and f) determining the depth of indentation. In preferred embodiment the surface being analyzed is a thin film and the mechanical properties being determined are hardness and Tg. Additionally, in preferred embodiments, as noted above, the surface is first scanned at a first time ($t_1$) over a broad range of temperature and load to obtain a coarse or low resolution determination of hardness and deformation, followed by a second slower ($t_2$) lateral scan over a narrower range of temperature and load to provide a finer i.e. higher resolution determination of hardness and Tg as a function of temperature and load. Also in preferred embodiments the method is performed using an array of tips/indenters.

Figure 3A:
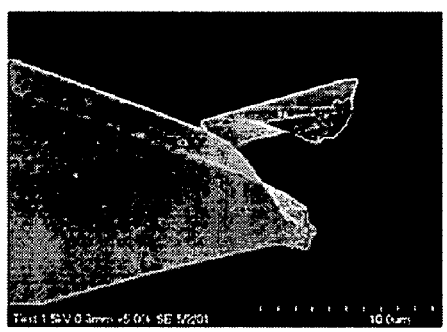
FIGS. 3A and B illustrate tip degradation using conventional methods to measure hardness. The tip illustrated is a silicon AFM tip after approximately 1000 hardness tests.
Figure 3B:
FIG. 3C illustrates the relatively marginal tip degradation using the method of the instant invention to measure hardness. The tip illustrated is a silicon AFM tip after approximately 1 million hardness tests.
Figure 3C:
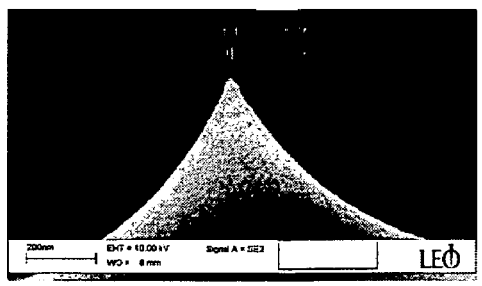

It should be noted that the load and temperature range are chosen to preserve integrity of the tip. The method disclosed in the current invention circumvents tip degradation problem by using heated tips. Using the method disclosed herein, the yield stress can be reduced to sufficiently low values not exceeding 1 GPa, such that a long tip lifetime can be assured. It has also been determined that the yield stress depends on the tip temperature, hot tips requiring lower stress values than cold tips. By measuring the temperature dependence of the yield strength at high tip temperatures and subsequently extrapolating to room temperature, the classic yield strength of hard materials can be reliably measured without sacrificing tip-lifetime. It is obvious that the extrapolation scheme can be employed to obtain the yield strength for any temperature value, in particular also for temperatures not directly accessible by the experiment (i.e. less than room temperature or greater than 600° C.). FIGS. 3A, 3B and 3C illustrate the preservation of tip integrity using the method of this invention. With reference to FIGS. 3A and B, it can be seen that dramatic tip wear occurs after approximately 1000 hardness tests on polymers using conventional methods. FIG. 3C illustrates, on the other hand that using the method disclosed herein results in only marginal tip wear after approximately one million hardness tests.

Figure 8:
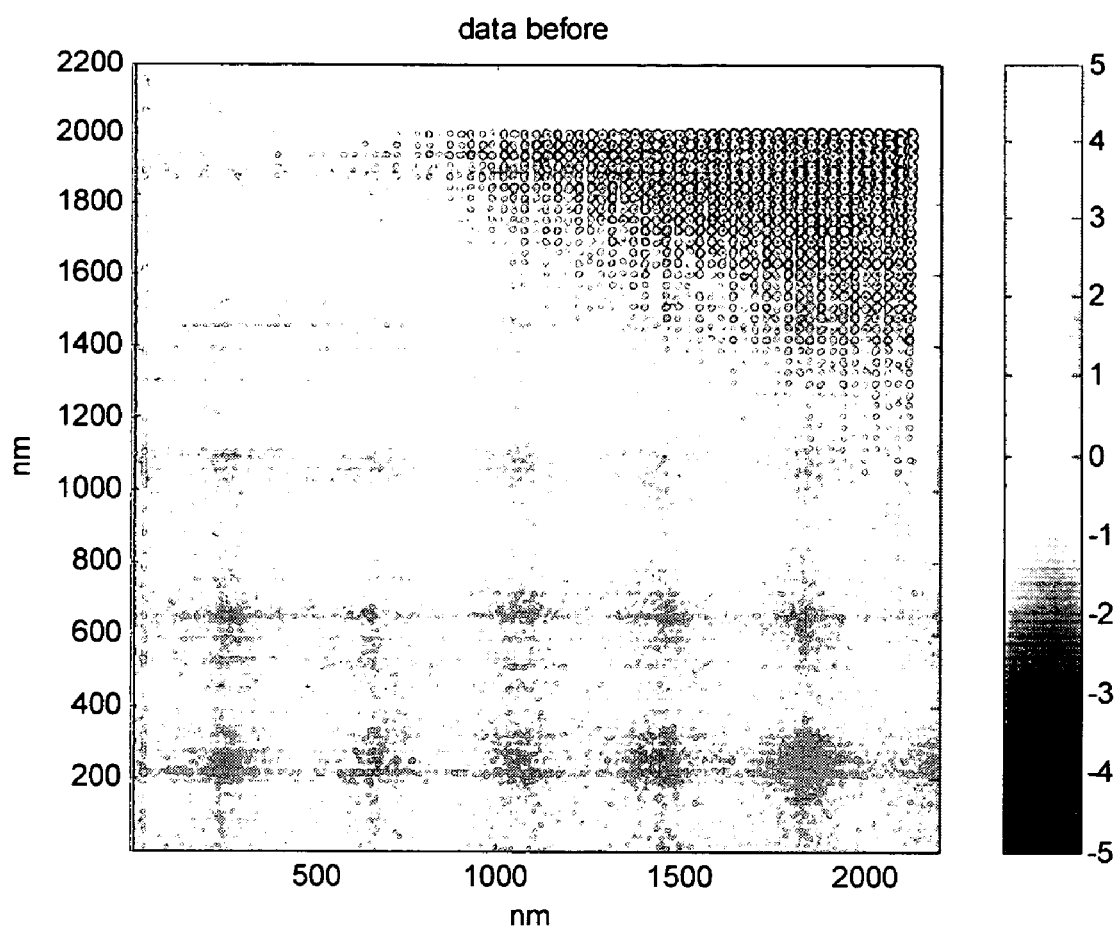
FIG. 8 illustrates graphically the 64 by 64 array obtained by variation of indentation time and temperature as described in Example 3 (Method III).

Example 2 describes three specific protocols. Method (I) describes the measurement of temperature dependent hardness (T(F)) at one indentation depth. The results are set forth in FIGS. 4, 5 and 6. Method (II) was performed in the same manner as Method (I) using a different indentation depth. This allows for the measurement of depth-sensing hardness and Tg. Method (III) illustrates the measurement of the indentation depth for a fixed load as a function temperature. The results are set forth in FIG. 8.

The method and apparatus described herein offer the following characteristics/advantages with respect to standard hardness measurements.

1. The method provides a well-defined extrapolation scheme which allows one to extract hardness and Tg data that would otherwise be inaccessible using standard methods. For example, if Tg falls in the temperature range of thermal degradation of the film or if the loading force required to obtain the indentation measurement is so high that the measurement would result in rapid destruction of the nanometer-size indenter tip. In other words, the ability to extrapolate the required measurements avoids the necessity of actually applying very low loads (which may require temperatures which are too high) or high loads (which may damage the tip).
2. The method has been performed down to microsecond indentation times, which constitutes an improvement of the measuring time of at least 6 orders of magnitude over conventional methods.
3. The method does not require the use a large sample area as illustrated by reference to FIG. 2.
4. The method does not require the extremely long equilibration times (on the order of tens of seconds) commonly required for current Tg testing methods. In the examples illustrated in FIGS. 2 and 4-6, heat and force pulses of 10 µs duration were used, allowing a full characterization of the film in terms of hardness, Tg and roughness within few minutes (approximately 5 minutes) including analysis and sample insertion.
5. Finally, using the method disclosed herein, it is possible to average over several measurements, in particular several indentations using the same heat and load, which results in less scatter in the data obtained.

The following examples are provided for illustrative purposes only and are not intended to limit the scope of the invention.

EXAMPLES

Example 1

General Method for Surface Analysis

An array of cantilever tips comprised of conductive, hard and stable materials such as silicone, silicone nitride or carbon are placed above the surface to be analyzed so as not to be in contact at the beginning of the scan. Smooth surfaces (<5 nm Ra) are preferable, but rough surface can also be characterized using this technique, but with less precision for the hardness measurements and a decreased probe tip lifetime. A coarse scan is optionally made over a wide range of temperature (20° C. to 600° C. using a coarse sampling rate ~1 sample/50° C.) and a wide range of load (10 nN to several µN using a coarse sampling rate of 1 sample per 100 nN). In other embodiments even coarser scans can be made if desirable. To perform the scan either the probe tip array or the sample can be moved. In preferred embodiments, the array is fixed and a precision sample stage is employed to move the sample under the fixed tip array. Using the results obtained from the coarse scan a finer, higher resolution scan is made.

Pits or indentations are produced in the sample surface by loading and heating of the tips in a "write" scan. After the pits have been formed the array is then placed back over the previously created pits to then measure the depth vs temperature and pit depth vs load for the array of pits. This data is then converted to plots of pit depth vs load and pit depth vs temperature to provide a series of plots for each load or temperature. This provides a complete characterization of the surface hardness as a function of temperature and the deformation of the surface as a function of load.

Example 2

Specific Methods for Measurement of Tg and Hardness of a Thin Film

This example describes three different protocols for measurement of Tg and hardness.

Method (I)

According to Method (I) the temperature dependent hardness (T(F)) was measured at one indentation depth (see e.g.

Figure 4:
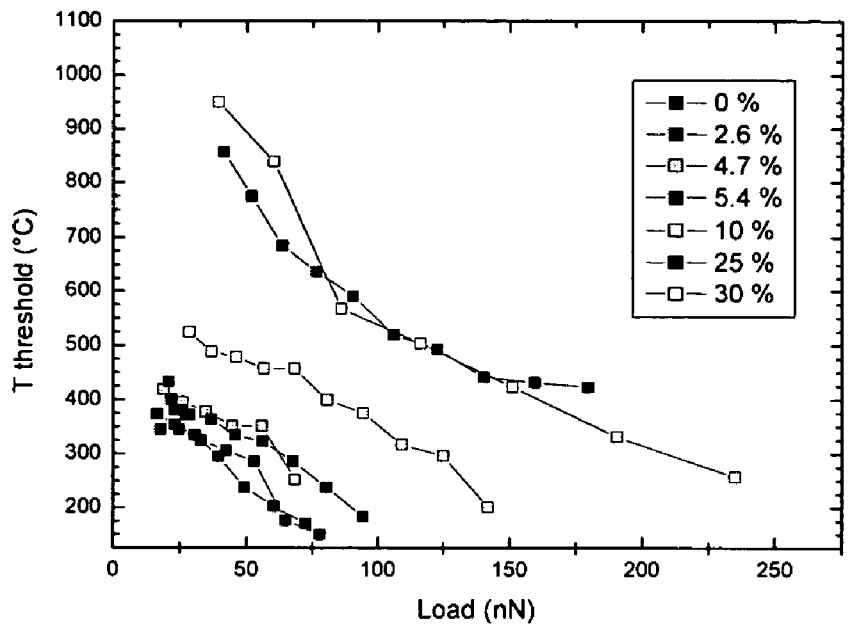
FIG. 4 illustrates graphically temperature dependent hardness measurements obtained according to method (I), showing T(F) curves at an indentation depth of 0.5 nm for three different samples. The three samples measured were 20 nm thick polystyrene films differing only in cross-link density. The legend denotes the percentage of cross-linker content (BCB).
Figure 5:
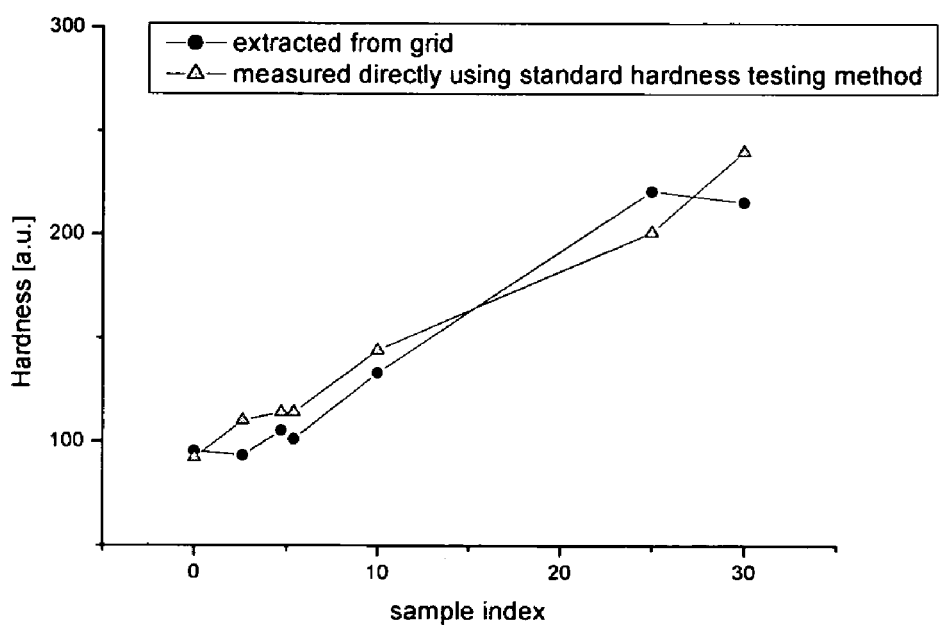
FIG. 5 illustrates graphically the hardness of samples measured in FIG. 4. The graph depicts hardness as a function of the sample index measured at room temperature. Sample index is equal to the percentage of BCB cross-linker. (●) obtained using the data set of FIG. 4 (method (I) and extrapolating F(T) to room temperature. (▲) obtained using a conventional hardness test performed at room temperature. It should be noted that that conventional tests involve high loading forces that drastically limit the number of measurements that can be done with a single tip.
Figure 6:
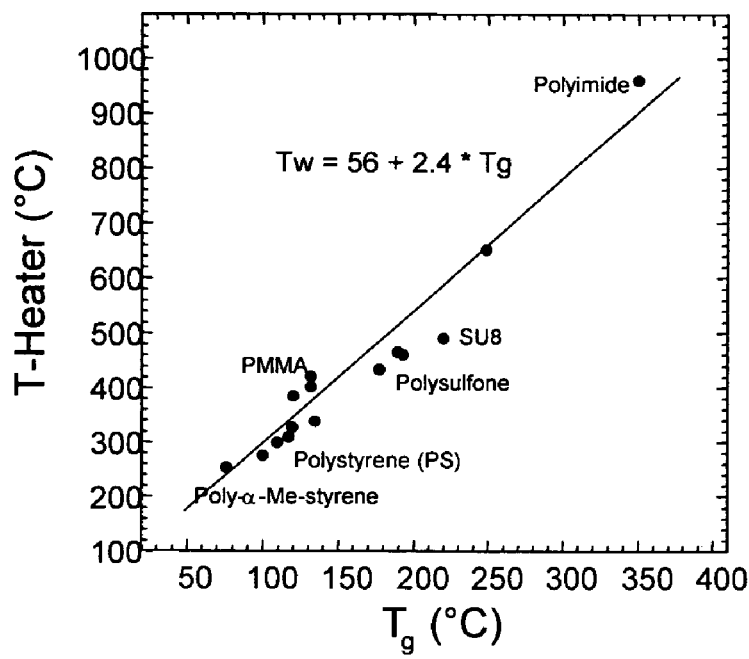
FIG. 6 illustrates graphically the correlation between the glass transition temperature (Tg) and bit writing temperature at low loading forces and a bit depth of 0.5 nm. Standard sized tip (R=10 nm) and a 10 μs indentation time were used. From experience it is known that this method allows the determination of Tg of an unknown sample with an accuracy of about 10° C.
Figure 7:
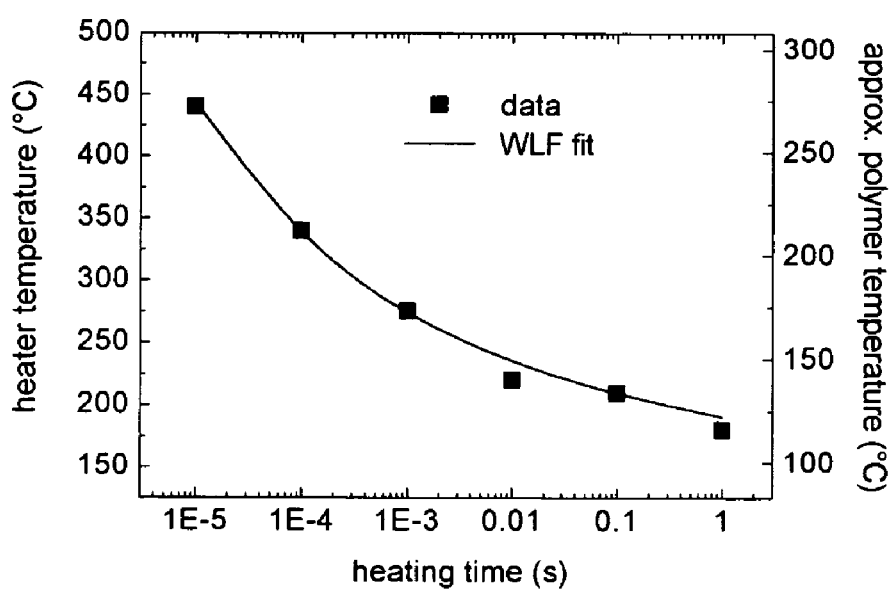
FIG. 7 illustrates graphically the correlation between indentation time and writing temperature. The data illustrated in FIG. 5 was obtained at a bit depth of 0.5 nm using a standard sized tip (R=10 nm) and a 40 nm thick PMMA sample.

FIG. 4 in which an indentation depth of 0.5 nm was used). The function T(F) is a measure of the temperature dependent hardness. The room temperature hardness, as commonly cited in literature, was obtained by extrapolation to T=room temperature as illustrated in FIG. 5 (●). Extrapolation of T(F) to zero load (F=0) provides a measure of the local glass transition temperature as shown in FIG. 6. It should be noted that the conversion factor relating Tg to T_heater in FIG. 6 depends on the tip shape. The shape of the tip can easily be determined by SEM or by using a reference measurement on a known sample. The same applies to the conversion factor between F(T=0) and the hardness.

Method (II)

Method (II) was performed in the same manner as Method (I) using a different indentation depth. This allows for the measurement of depth-sensing hardness and Tg.

Method (III)

Measurement of the indentation depth for a fixed load as a function temperature yields the temperature dependence of hardness for samples for which the hardness is not a function of depth. An array of 64 by 64 indentation events was carried out on a polymer film. The heater temperature was varied between 50° C. and 500° C. linearly along the y-axis. The heating time was varied logarithmically from 1.6 µs to 1 s along the x-axis. Similarly to the procedure described above, in which heat and load force were varied, the indentation depth is the extracted information. A plot time-versus-temperature for a fixed indentation depth serves to determine the shift factors of the polymer. The results are set forth in FIG. 8.

Background: Such shift factors determine the variation of material properties as a function of both time scale and temperature and are an important property of polymers. They are usually determined in DMTA (dynamic mechanical thermal analysis), dielectric spectroscopy (if applicable), viscosimeters (if applicable), etc. As noted in the Background section above, all the standard methods can usually not be applied to extremely thin films. Further, the temperature and frequency range that can be applied using the disclosed method can be chosen very freely in contrast to DMTA.

What is claimed is:

1. A method for measuring the mechanical properties of surface as a function of temperature, load, and the duration of time of applying said temperature and load, said method comprising of the steps of:
   a) providing an array of more than one cantilever tip, wherein each of said tips in said array of tips is spaced at select distances along X and Y axes;
   b) positioning said array of tips relative to the surface;
   c) contacting more than one of said tips in said array of tips with the surface;
   d) heating more than one of said tips in said array of tips to a select temperature;
   e) applying a select load to more than one tip in said array of tips for a select time;
   f) determining the depth of indentation produced by each of said tips; and
   g) repeating steps b) to f) positioning said array of tips at select intervals along the X and Y axes, with a first incremental select spacing along the X axis and a second incremental spacing along the Y axis, wherein one parameter selected from the group consisting of temperature, load and time is varied a first incremental select amount between each position along the X axis and a second parameter, different from the first parameter, selected from the group consisting of temperature, time and load is varied a second incremental select amount between each position along the Y axis.

2. The method of claim 1 wherein said array is comprised of 8 to 16 tips.

3. The method of claim 1 further comprising the step of determining the mechanical properties of the surface as a function of temperature, load and depth of indentation.

4. The method of claim 1 wherein a second positioning at select intervals along the X axis is performed with a third incremental select spacing along the X axis, wherein said third incremental spacing is less than said first incremental spacing.

5. The method of claim 1 wherein a second positioning at select intervals along the Y axis is performed with a fourth incremental select spacing along the Y axis, wherein said fourth incremental spacing is less than said second incremental spacing.

6. The method of claim 1 wherein said surface is a thin film.

7. The method of claim 1 wherein said mechanical properties are selected from the group consisting of hardness, glass transition temperature (Tg), elastic modulus, loss modulus, cross-link density, material homogeneity and solvent-uptake.

8. The method of claim 1 wherein said tip is comprised of a material selected from the group consisting of silicon, silicon nitride, diamond, diamond like carbon (DLC) and amorphous carbon.

9. The method of claim 1 wherein said tip is heated to a temperature ranging from between room temperature 20° C. and 600° C.

10. The method of claim 1 wherein said load is selected from a range of between 10 nN to approximately 2 µN.

11. The method of claim 1 wherein said time of applying said temperature and load is selected from a range of between 1 µs and 1 s.

12. A method for measuring the mechanical properties of surface as a function of temperature, load, and the duration of time of applying said temperature and load, said method comprising of the steps of:
   a) providing an array of more than one cantilever tip, wherein each of said tips in said array of tips is spaced at select distances along X and Y axes;
   b) positioning said array of tips relative to the surface;
   c) contacting more than one of said tips in said array of tips with the surface;
   d) heating more than one of said tips in said array of tips to a select temperature;
   e) applying a select load to more than one tip in said array of tips for a select time;
   f) determining the depth of indentation produced by each of said tips;
   g) repeating steps b) to f) positioning said array of tips at select intervals along the X and Y axes, with a first incremental select spacing along the X axis and a second incremental spacing along the Y axis, wherein said temperature is varied a first incremental select amount between each position along the X axis and the force is varied a second incremental select amount between each position along the Y axis; and
   h) repeating step g) wherein a second positioning at select intervals along the X axis is performed with a third incremental select spacing along the X axis, wherein said third incremental spacing is less than said first incremental spacing and wherein a second positioning at select intervals along the Y axis is performed with a fourth incremental select spacing along the Y axis, wherein said fourth incremental spacing is less than said second incremental spacing.

* * * * *